United States Patent [19]

Destruhaut

[11] Patent Number: 4,568,369

[45] Date of Patent: Feb. 4, 1986

[54] METHOD AND APPARATUS FOR RAPIDLY ALTERING THE TEMPERATURE OF FLUID IN A CLOSED VESSEL

[75] Inventor: Louis-Michel Destruhaut, Aubagne, France

[73] Assignee: Marie Brizard & Roger International, France

[21] Appl. No.: 473,152

[22] Filed: Feb. 28, 1983

[30] Foreign Application Priority Data

Feb. 26, 1982 [FR] France ................................ 82 03302

[51] Int. Cl.⁴ .............................................. F25D 17/02
[52] U.S. Cl. ......................................... 62/64; 62/373;
137/393; 137/409; 239/518; 239/590
[58] Field of Search ........................... 62/64, 373, 376;
239/518, 590; 137/393, 416

[56] References Cited

U.S. PATENT DOCUMENTS

| | | | |
|---|---|---|---|
| 1,831,880 | 11/1931 | Pierce | 62/64 |
| 1,964,836 | 7/1934 | Wheaton | 239/590 |
| 2,120,620 | 6/1938 | Mowery | 239/518 |
| 2,140,744 | 12/1938 | Hirsch | 62/373 |
| 2,959,023 | 11/1960 | Webster | 62/373 |
| 3,642,213 | 2/1972 | Parkison et al. | 239/590 |
| 4,023,621 | 5/1977 | Olson | 62/64 |

*Primary Examiner*—Ronald C. Capossela
*Attorney, Agent, or Firm*—Mason, Fenwick & Lawrence

[57] ABSTRACT

To alter rapidly the temperature of fluid 3 in a closed vessel 1, a nozzle 6 is disposed above the vessel 1, and an annular cross-section jet 17 of liquid at an appropriate temperature is directed at the vessel 1 so as to form a coherent film 18 covering its entire surface. Preferably the liquid, which may conveniently be water, is supplied at a high rate under a low pressure so as to preserve lamellar flow. Advantageously the annular cross-section jet 17 is conical, being directed downwardly and inwardly. The fluid 3 in the vessel 1 can be maintained at a desired temperature by continued application of the jet 17 of liquid.

The invention is suitable for use with glass bottles and has application in food pasteurization.

18 Claims, 2 Drawing Figures

METHOD AND APPARATUS FOR RAPIDLY ALTERING THE TEMPERATURE OF FLUID IN A CLOSED VESSEL

BACKGROUND OF THE INVENTION

1. Field of the Invention

The present invention relates to a process and apparatus for rapidly altering, both upwards and downwards, the temperature of a liquid or thick fluid in a closed vessel. The invention also relates to a process and apparatus for maintaining the treated liquid at the raised or lowered temperature. The invention is especially suitable for use with hermetically closed glass bottles.

It is known that the suddenness in such changes in temperature is highly desirable in some activities, particularly in the areas of pharmacy and foodstuffs, for example for fruit and vegetable juices, for milk products, for beer and for cider, and in general terms for all food products which need to be protected against fermentation, the protective technique then used involving pasteurizing the product and then cooling it as quickly as possible, within a maximum period of thirty minutes, to prevent deterioration of the product which would result from its rise in temperature.

2. Prior Art

To cool suddenly any unit consisting of a glass bottle (the container) and a pasteurized fluid (the content), two techniques are used at the present time, namely immersion and sprinkling or spraying.

It is known that a glass bottle filled with a very hot liquid can be immersed abruptly in cold water without any risk of breakage, since in such a case the stresses exerted on the glass are uniform at all points of the container.

The technique of abrupt immersion of a pasteurized fluid/glass unit in cold water is therefore satisfactory as regards the results which it ensures, cooling to ordinary temperature being obtained in as short a period as possible. However, this technique is used relatively rarely because it is difficult to put into practice, particularly when the pasteurized products are delivered in their sealed glass receptacles on a chain operating continuously. In particular, the surrounding moisture causes damage to some parts of the chain and this damage, even though it be minor, makes it necessary to stop the chain, with the result that this technique is incompatible with the continuous distribution of the pasteurized products.

In spite of the absolute effectiveness of the immersion technique, the sprinkling technique is preferred to it more and more often.

In this other technique, to prevent irregular stresses from being exerted on the glass, and thus to prevent probable breakages, the spraying nozzles are distributed around, above and below the glass bottles to be cooled, so as to spray effectively everywhere and thus to maintain at all points on the glass one and the same temperature at any moment of its cooling.

Nevertheless, this sprinkling technique has a major defect: because the work is carried out under high pressure, the holes in the nozzles frequently become blocked, resulting in difficulty in ensuring uniformity of spraying.

Uniformity is all the more difficult to obtain on a continuously operating chain because many glass bottles have to be cooled progressively all along the chain, so that the number of nozzles is considerable, and in addition because each nozzle is constructed with a large number of holes, in theory for assisting uniform spraying.

When the sprinkling technique is put into effect, the losses due to breakages are therefore unfortunately frequent.

INTRODUCTION TO THE INVENTION

The purpose of the present invention is, therefore to mitigate the above-mentioned disadvantages. It proposes a technique of sudden cooling which is compatible with continuous operation, any moist atmosphere being avoided, and has a high reliability as regards efficiency, uniform and regular cooling and thus eliminating any risk of breakage.

In its use converse to that which has just been described, namely for the purpose of obtaining a sudden rise in the temperature of a container/content unit, the present invention additionally meets a need for which no satisfactory practical solution has hitherto been proposed.

It is known that the pasteurization of a fermentable liquid or thick fluid can be carried out satisfactorily at temperatures well below its boiling point, provided that the rise in temperature takes place as suddenly as possible so as to cause a considerable thermal shock within the fluid to be pasteurized, and provided that the said fluid is maintained at this high temperature for a sufficiently long time.

According to certain criteria which can easily be monitored, especially acidity, it is possible, for example, to achieve good pasteurization of fruit and vegetable juices between 70° and 75° C., on the indispensable condition that the transition from the ambient temperature to the pasteurization temperature takes place within a maximum time of four minutes and that the treated liquid is maintained at this temperature of 70° to 75° C. for a further four minutes.

The present invention provides for this other use in that it allows a sudden alteration in the temperature of a containing glass/contained fluid unit within the range of abrupt rises in temperature, without the risk of breakages and in a way compatible with chains working continuously, in the same way as it allows abrupt lowering of temperature.

The present invention can have a two-fold use in any pasteurization operation: by permitting a sudden rise in temperature and then maintaining this high temperature, it makes it possible to pasteurize fermentable liquids between 70° and 75° C., and by allowing a sudden lowering of temperature, it makes it possible to "block" the treated liquid in this ideal situation for asepticization and to prevent its deterioration.

In a first aspect the present invention provides a process for rapidly altering the temperature of a fluid in a closed vessel, the said process involving bringing a liquid, such as water, at a temperature substantially different from that of the fluid in the vessel into lasting contact with the outer wall of the vessel the said process being characterised in that a flow of the liquid above the vessel is provided so as to form a film of liquid which envelops the vessel totally, and in that the rate and pressure of this flow are adjusted so as to maintain this film all round the vessel in a coherent fashion.

In a preferred method of putting this process into practice, the flow of liquid is supplied in the form of a jet of annular cross-section, the said annular jet advantageously being conical and converging downwards in the direction of the vessel.

In another preferred method of putting this process into practice, the flow of liquid is supplied at low pressure, this pressure remaining low so as to maintain the liquid jet in a lamellar state, but sufficient to prevent the surface tension from breaking this jet.

The flow of liquid is preferably supplied at a very high rate and at a low pressure obtained from a reserve of liquid at a height of between 10 and 30 centimeters, preferably between 15 and 20 centimeters.

In an advantageous alternative method of putting this process into practice, especially for continuous operation, the liquid is recovered after use and is recycled, after possible heating or cooling.

In a second aspect the present invention also provides apparatus for rapidly altering the temperature of a fluid in a closed vessel, the apparatus comprising means for bringing a heating or cooling liquid into contact with the outer wall of the vessel and being characterised in that it incorporates a nozzle above the vessel which supplies a stream of liquid in the form of a jet of annular cross-section, the nozzle being associated with means of adjusting the flow rate and pressure of this stream so that it forms round the vessel a film which envelops it totally and coherently. The heating or cooling liquid will normally be water.

Preferably the nozzle is located above the vessel so that their vertical axes of symmetry are merged.

In an especially advantageous design, the nozzle is formed by a duct with a wall in the form of a truncated cone converging downwards and by a conical central core having the same angle at the vertex as the duct and spaced evenly from the said duct so as to delimit with the latter a converging conical channel for the flow of the jet of liquid, the core being fixed to the duct at points located as from the outflow orifice as possible so as not to disturb the state of flow of the liquid.

The thickness of the jet at its outflow from the nozzle is preferably approximately 2 millimeters.

BRIEF DESCRIPTION OF THE DRAWINGS

An embodiment of the present invention, given by way of example, will now be described with reference to the accompanying drawings in which.

DESCRIPTION OF THE PREFERRED EMBODIMENT

Figures 1, 2:
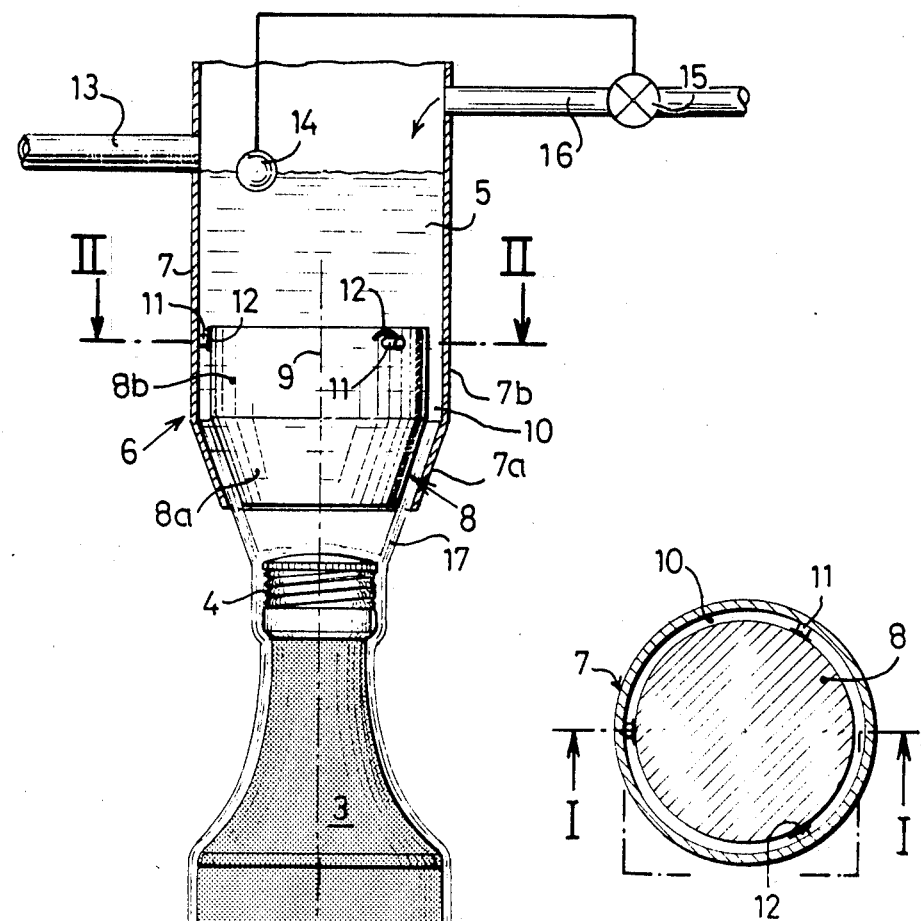
FIG. 1 is a view, in a vertical axial section, of apparatus embodying the invention during operation.
FIG. 2 is a sectional view along the line II—II of the nozzle which supplies the stream of liquid in the form of a jet of annular cross-section.

A glass bottle 1 of any shape is placed on a horizontal plane so that its longitudinal axis of symmetry 2 extends exactly in a vertical line.

The bottle 1 contains a liquid 3 and is sealed in its upper part, for example by a pressed cap or by a cap 4 tightened simply by screwing.

The liquid 3 contained in the bottle 1 is either to be cooled abruptly or to be heated abruptly or else to be heated suddenly and maintained for a few minutes at this relatively high temperature to pasteurize it and then to cool it just as suddenly so as to maintain it in this situation of total asepticization.

In all the cases mentioned above, the same installation as that shown in FIG. 1 can be used, and only the liquid dispensed by the installation and intended for altering the temperature of the fluid 3 is selected or varied as regards its temperature, according to whether it is to act as a cooler or as a heater.

The installation embodying the invention consists essentially of a reservoir of water 5 prolonged downwards by one or more nozzles 6 equal in number to the number of bottles which, located under the reservoir are to undergo the sudden change in temperature desired.

All the nozzles 6 are identical and consist of an annular outer wall 7 and a solid central core 8.

The lower part 7a of the wall is in the form of a truncated cone converging downwards, and this part in the form of a truncated cone is, if appropriate, prolonged upwards as far as the reservoir 5 of a cylindrical part 7b.

The core 8 is exactly the same shape as the outer wall 7, that is to say it is conical at 8a in its lower part and is, if appropriate, prolonged in its upper part in a cylinder 8b.

The cones 7a and 8a have the same included angle and are arranged along a common vertical axis 9, so that the channel 10 delimited between the outer wall 7 and the central core 8 in the lower part of the nozzle 6 has a constant width at all points and forms a downwardly converging chamber approximately 2 mm wide in the form of a truncated cone.

In the event that, in their upper part, the wall 7 and the core 8 are shaped into cylinders 7b and 8b, these components are, of course, arranged likewise with a common vertical axis of symmetry 9, so that the channel 10 forms a cylindrical annular chamber of constant width between the reservoir 5 and the lower conical part of the said channel.

To ensure good centring of the core 8 within the wall 7, there are in the upper part of this assembly, in a region as distant as possible from the outlet orifice, three fastening points 11 arranged at 120° from one another. Each of these points is formed, for example, by a pin which is welded to the inside of the wall 7 and the length of which is equal to the width of the channel 10 so as to centre the core 8 automatically, the said pins interacting with staples 12 in the form of an inverted U, which are welded to the cone 8. The staples 12 come to rest on the pins 11 and thereby stabilise and position the core 8 with respect to the wall 7.

For smooth operation of the apparatus described above, the bottle 1 is arranged vertically under the nozzle 6, its longitudinal axis of symmetry 2 forming exactly a prolongation of the axis of symmetry 9 of the nozzle.

Also for smooth operation of the apparatus which has been described, the water contained in the reservoir 5 is maintained at a constant level of the order of 10 to 30 cm, preferably of the order of 15 to 20 cm, this level being adjusted as a function of the flow rate and pressure which are necessary to ensure that a film of water continues to envelop the bottle 1 totally and in a coherent fashion.

For this purpose, the reservoir 5 is associated either with an overflow pipe 13 or with a float 14 which controls a valve 15 mounted on a pipe 16 for conveying water into the reservoir 5.

According to the process proposed by the present invention, the water pressure in the reservoir must remain low so as to maintain the liquid jet dispensed by the channel 10 of the nozzle 6 in a lamellar state, but at the same time must be sufficient to prevent the surface tension from breaking this jet.

It is essential for the jet of water to be dispensed in a coherent fashion onto the bottle so as to avoid substantial temperature differences between two closely adjacent regions of the bottle, and in this way to prevent stresses from being exerted which inevitably cause cracking and even breaking of the glass.

The bottle 1 is placed under the conical annular jet 17 of water dispensed from the reservoir 5 via each nozzle 6, the cap 4 being framed exactly by this jet.

Under these conditions, the water strikes the upper edge of the cap, then passes over the top of it, since the interior of the conical jet of water is under a partial vacuum, and then flows along the side wall of the bottle 1 where the adhesion forces apply it in a thin and coherent film 18.

The stream of water therefore follows exactly the profile of the bottle down to the base, so that the bottle is permanently enveloped totally in a coherent film 20 which, at any moment during the operation, brings all the points of the bottle to one and the same temperature under conditions identical to those obtained by the immersion technique.

Since the plane on which the bottle 1 rests is advantageously a grill 20 or a fine-mesh grating, the film of water converges in the centre of the bottom of the bottle, from where it flows in a rod-shaped jet 19.

Apart from the fact that the bottle is permanently enveloped in the coherent film of water 18 which puts it under conditions identical to immersion, the advantage of putting into practice the above-mentioned process is that as soon as it starts to operate, it creates a considerable difference between the temperature of the liquid 3 located in the bottle 1 and the temperature of the treatment water.

The result, in a cooling operation, of this considerable difference in temperature is that it generates a convection movement. The liquid in the bottle cools more quickly at the top than at the bottom, and cools more quickly in the regions near the wall of the bottle than in its centre, and this convection movement further assists cooling and reduces the treatment time, since it mitigates the problems of heat transmission inherent in the nature of the liquid to be treated.

In an experiment carried out on a bottle of previously pasteurized fruit juice, only 4 minutes were necessary to pass from 73° to 20° C., this time being nearly one seventh of that sufficient to prevent deterioration of the fruit juice which would result from its rise in temperature.

The apparatus which has just been described can, of course, be transferred without difficulty to any chain intended to operate continuously. A first bank of nozzles 6 can be arranged under a first reservoir of water 5 which spray at a certain temperature, and this reservoir can be followed by a second reservoir provided with another bank of nozzles which spray the bottles to be treated at another temperature slightly below or slightly above that of the treatment liquid contained in the first reservoir.

The number of reservoirs and the number of banks of nozzles are, of course, a function of the intended period of cooling or of heating.

In such a continuous process, there is advantageously the possibility of recovering, after use, the liquid flowing under the grill 20 and of recycling this liquid in the installation via the delivery pipe 16.

In such a case, the recycling circuit comprises a heating assembly or a refrigerating assembly, depending on whether the liquid located in the reservoir 5 is to be hot or cold, to pasteurize the liquid 3, or on the contrary to determine this pasteurization as a result of a sudden lowering of temperature.

In the preceding description the invention was described as applying to the heating or cooling of a liquid or thick fluid enclosed in a sealed bottle. It is clear, however, that without any modification the invention likewise applies to maintaining the temperature of the said fluid outside the normal temperature, either in the course of a pasteurization operation in which, after a sudden rise in the temperature of the fluid, the said fluid must be maintained for a few minutes at this relatively high temperature before being cooled just as suddenly, or during the course of freezing or another similar operation in which the fluid would have to be cooled and maintained at a temperature markedly different from the ambient temperature.

Various alternative forms of the present invention are possible.

The dispensing jet of the stream of water can have, for example, a cylindrical annular cross-section.

However, dispensing in a conical jet is preferable since it allows compensation in the play of the water jet when the axis of the nozzle 6 is not aligned perfectly with the axis 2 of the bottle 1 and/or when the bottle moves a little as a result of the advance of the grill 20 when the installation according to the invention is arranged on a continuously operating chain.

Likewise, the width of the annular chamber in the form of a truncated cone, and consequently the thickness of the conical annular jet 17 can be substantially different from the value of 2 mm indicated by way of example in the present description, the thickness of the said jet 17 being essentially a function of the diameter and the shape of the bottle containing the fluid to be treated.

With this in mind, it is possible, moreover, to provide easy adjustment of the width of the chamber for dispensing the treating liquid by means of an adjustment of the height of the core 8 in relation to the outer wall 7 of the nozzle.

It is possible, for example, to provide a set of wedges of different thicknesses to be interposed between the pins 11 and the staples 12.

What is claimed is:

1. A method of rapidly altering the temperature of a fluid in a closed upright glass bottle and, if desired, of maintaining the fluid at a predetermined temperature comprising the steps of
    providing a flow of liquid, at a temperature substantially different from the initial temperature of the fluid in the glass bottle, downwardly onto the bottle in a manner so as to form a film of said liquid which totally envelops the outer wall of the bottle, and
    controlling the rate and pressure of said flow in such a manner to maintain the film in a coherent form around the bottle.

2. A method according to claim 1 in which the said flow of liquid is in the form of a jet of annular cross-section.

3. A method according to claim 2, in which the jet is conical, converging downwards in the direction of the bottle.

4. A method according to claim 2 in which the flow of liquid is provided at pressure which is sufficiently low for the liquid jet to be in a lamellar state, and which is sufficiently high to prevent the surface tension from breaking the jet.

5. A method according to claim 1 further comprising the steps of recovering and recycling the liquid from the said flow after use.

6. A method according to claim 1 in which the flow of liquid is supplied at a pressure obtained from a reservoir of liquid with a height of between 10 and 30 cm.

7. A method according to claim 6 in which the height of the reservoir is between 15 and 20 cm.

8. A method according to claim 1 wherein said flow of liquid is provided from a reservoir of said liquid positioned above said upright glass bottle from which reservoir said nozzle depends.

9. A method according to claim 8 wherein said liquid in said reservoir is maintained at a constant level during the providing of said flow of liquid to control the rate and pressure of the flow of said liquid.

10. A method according to claim 1 wherein said liquid comprises water.

11. Apparatus for rapidly altering the temperature of a fluid in a closed upright glass bottle and, if desired, for maintaining the fluid at a given temperature, comprising
   a nozzle, located above the bottle in use, for supplying a stream of heating or cooling liquid in the form of a jet of annular cross-section directed downwardly towards the bottle, and
   means, associated with the nozzle, for controlling the flow rate and pressure of the said stream so that it forms around the outer wall of the bottle a film of said liquid which envelops the outer wall of the bottle totally and maintains said film of said liquid in a coherent form.

12. Apparatus according to claim 11 in which the nozzle and the bottle have vertical axes of symmetry which are aligned with each other.

13. Apparatus according to claim 11 in which the nozzle has a wall in the form of a truncated cone converging downwardly and a conical central core which has the same included angle as the wall and is evenly spaced from the wall and within it so as to delimit, together with the wall, a converging conical channel for the flow of the jet of liquid, the core being attached to the wall at points remote from the outlet orifice of the nozzle.

14. Apparatus according to claim 13 in which the position of the core is adjustable vertically in relation to the said wall of the nozzle, so as to adjust thereby the thickness of the jet of liquid supplied through the said nozzle.

15. Apparatus according to claim 11 further comprising a grill located beneath the vessel and under which the liquid is recovered after use and recycled.

16. Apparatus according to claim 11 in which the thickness of the jet at its outflow from the nozzle is approximately 2 mm.

17. Apparatus according to claim 11 further comprising a reservoir of said liquid from which said nozzle depends positioned above said upright glass bottle.

18. Apparatus according to claim 17 further comprising means to maintain liquid in said reservoir at a constant level.

* * * * *